(12) United States Patent
Ueno et al.

(10) Patent No.: US 11,478,864 B2
(45) Date of Patent: Oct. 25, 2022

(54) T-SHAPED TOOL AND METHOD FOR MANUFACTURING T-SHAPED TOOL

(71) Applicant: MAKINO MILLING MACHINE CO., LTD., Tokyo (JP)

(72) Inventors: Hiroshi Ueno, Fujiyoshida (JP); Ryoichi Miyamoto, Fujiyoshida (JP); Fukuhito Nagata, Fujiyoshida (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 56 days.

(21) Appl. No.: 16/955,295

(22) PCT Filed: Dec. 22, 2017

(86) PCT No.: PCT/JP2017/046215
§ 371 (c)(1),
(2) Date: Jun. 18, 2020

(87) PCT Pub. No.: WO2019/123652
PCT Pub. Date: Jun. 27, 2019

(65) Prior Publication Data
US 2021/0086275 A1    Mar. 25, 2021

(51) Int. Cl.
*B23C 5/12* (2006.01)
*B23C 5/10* (2006.01)

(52) U.S. Cl.
CPC ............. *B23C 5/1063* (2013.01); *B23C 5/12* (2013.01)

(58) Field of Classification Search
CPC ... B23C 2240/32; B23C 2240/16; B23C 5/12; B23C 5/1063; B23C 5/1054; B23C 2240/00; B23C 2210/02; B23B 51/0473; B23B 2240/00; B23B 2240/24; B23B 51/0004; B23B 51/0003; B23B 51/0461
See application file for complete search history.

(56) References Cited

U.S. PATENT DOCUMENTS

| | | | |
|---|---|---|---|
| 5,971,670 A | * | 10/1999 | Pantzar ............... B23B 31/1107 407/119 |
| 2001/0041089 A1 | | 11/2001 | Hecht |
| 2015/0330434 A1 | | 11/2015 | Stjernstedt |
| 2016/0332241 A1 | * | 11/2016 | Liu ........................... B23C 5/10 |

(Continued)

FOREIGN PATENT DOCUMENTS

| | | | |
|---|---|---|---|
| DE | 202015106360 U1 | * 11/2015 | ............... B23C 5/10 |
| DE | 102016105210 A1 | 9/2017 | |
| EP | 3170598 | 5/2017 | |

(Continued)

OTHER PUBLICATIONS

International Search Report and Written Opinion dated Feb. 27, 2018, directed to International Application No. PCT/JP2017/046215; 17 pages.

*Primary Examiner* — Alan Snyder
(74) *Attorney, Agent, or Firm* — Morrison & Foerster LLP

(57) ABSTRACT

A T-shaped tool is configured by fastening a head having cutting blades to a cylindrical shank, the shank is made of cemented carbide and has a tapered male thread formed at a tip end portion thereof, the tapered male thread becomes smaller in diameter toward the tip end, and the head is made of steel and has a tapered female thread formed therein, and the tapered female thread comes into engagement with the tapered male thread.

2 Claims, 5 Drawing Sheets

(56) References Cited

U.S. PATENT DOCUMENTS

2019/0015912 A1   1/2019   Mayer et al.

FOREIGN PATENT DOCUMENTS

| JP | H10-203297 A | 8/1998 | | |
|---|---|---|---|---|
| JP | 2000-190118 A | 7/2000 | | |
| JP | 2013-534189 A | 9/2013 | | |
| JP | 2015-24491 A | 2/2015 | | |
| JP | 2015-217511 A | 12/2015 | | |
| WO | 96/06702 A1 | 3/1996 | | |
| WO | 2006/033617 A1 | 3/2006 | | |
| WO | WO-2006033616 A1 * | 3/2006 | ......... | B23B 31/1107 |
| WO | 2012/023127 A1 | 2/2012 | | |
| WO | 2015/171721 A1 | 11/2015 | | |

\* cited by examiner

T-SHAPED TOOL AND METHOD FOR MANUFACTURING T-SHAPED TOOL

CROSS-REFERENCE TO RELATED APPLICATIONS

This application is a U.S. national stage application under 35 USC 371 of International Patent Application No. PCT/JP2017/046215 filed Dec. 22, 2017, the entire contents of which are incorporated herein by reference.

FIELD OF THE DISCLOSURE

The present invention relates to a T-shaped tool such as a T-groove milling cutter, a dovetail milling cutter, or a Christmas tree milling cutter in which a tool body having a cutting edge and a cylindrical shank are connected in an approximately T-shape in a side view, and a method for manufacturing the same.

BACKGROUND OF THE DISCLOSURE

T-shaped tools comprising a shank and a head (tool body) connected to the tip of the shank have been conventionally well-known. For example, Patent Literature 1 describes a T-shaped cutter (T-groove milling cutter) in which a cutting head having a cutting edge on the outer periphery thereof is detachably attached to the tip of the shank by means of a screw. The cutting head has an annular projection in the central portion of the side surface facing the shank, and the cutting head and the shank are connected by bringing the end surface of the annular projection into contact with the end surface of the shank, inserting a fixation screw into a head hole formed in the center of the cutting head from the opposite side surface of the cutting head, and engaging the screw with an internal thread formed on the tip of the shank.

PATENT LITERATURE

PTL 1 Japanese Unexamined PCT Application (Kohyo) No. 2013-534189

BRIEF SUMMARY OF THE DISCLOSURE

In the T-shaped tool described in Patent Literature 1, the shank is tensioned by the fixation screw in a state in which it is in contact with the end surface of the projection of the cutting head. Thus, an axial tensile load is continuously exerted on only one side of each thread of the internal thread of the shank engaged with the fixation screw. Shanks are generally formed from cemented carbide, and cemented carbide has a high compressive strength but a low tensile strength. Thus, in the invention of Patent Literature 1, since the thread lacks rigidity, it is difficult to firmly secure the cutting head to the shank.

Thus, the present invention aims to solve such problems of the prior art by providing a highly-rigid T-shaped tool which can easily be manufactured and a method for the manufacture thereof.

In order to achieve the object described above, according to the present invention, there is provided a T-shaped tool comprising a tool body having a cutting edge and a cylindrical shank which are connected in a T-shape in a side view, wherein the shank is composed of cemented carbide and has a tapered external thread, the diameter of which decreases in the tip direction, formed on a tip thereof, the tool body is composed of steel and has a tapered internal thread for engagement with the tapered external thread, and the shank and the tool body are connected by engaging the tapered external thread with the tapered internal thread.

Furthermore, according to the present invention, there is provided a method for manufacturing a T-shaped tool in which a tool body having a cutting edge and a cylindrical shank are connected in a T-shape in a side view, the method comprising the steps of forming a tapered external thread, the diameter of which decreases in the tip direction, on a tip of the shank, which is composed of cemented carbide, forming a tapered internal thread for engagement with the tapered external thread on the tool body, which is composed of steel, and connecting the shank and the tool body by engaging the tapered external thread with the tapered internal thread.

According to the present invention, a tool which is approximately T-shaped in a side view is formed by engaging the tapered external thread of the shank with the tapered internal thread of the tool body. Due to the tapered threads, the shank can be tightly engaged with the internal thread of the tool body with a high fastening torque even without, for example, abutting the end face of the shank onto the tool body. Thus, when the tool body is threadedly connected to the shank, a tensile load is not exerted on the tapered external thread of the shank, unlike in the invention of Patent Literature 1, and as the threads are tightened, a compressive load is exerted on each thread of the tapered external thread of the shank, which is composed of cemented carbide, from both sides in the axial direction. Thus, cemented carbide having high rigidity can be used for the shank, and also the rigidity of the connection part between the shank and tool body becomes higher, whereby machining speed (cutting speed) can be increased to improve machining efficiency. Furthermore, by forming the shank from cemented carbide, the shank is less likely to be deformed, whereby machining accuracy can be improved.

DETAILED DESCRIPTION OF THE DISCLOSURE

Figure 1:
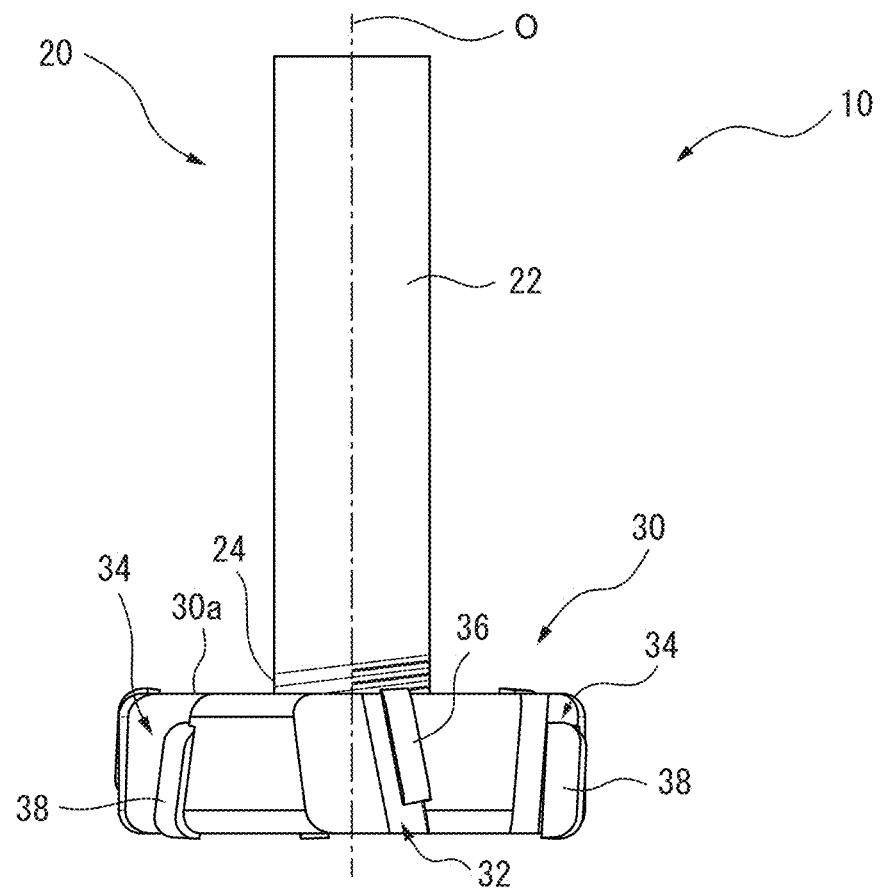
FIG. 1 is a side view of a T-shaped tool according to a preferred embodiment of the present invention.
Figure 2:
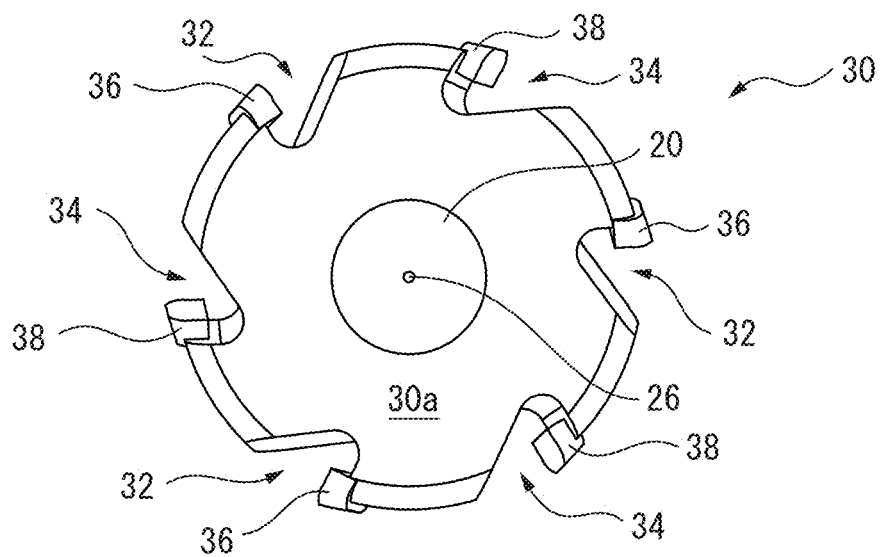
FIG. 2 is a plan view of the T-shaped tool of FIG. 1 as viewed from the shank side.
Figure 3:
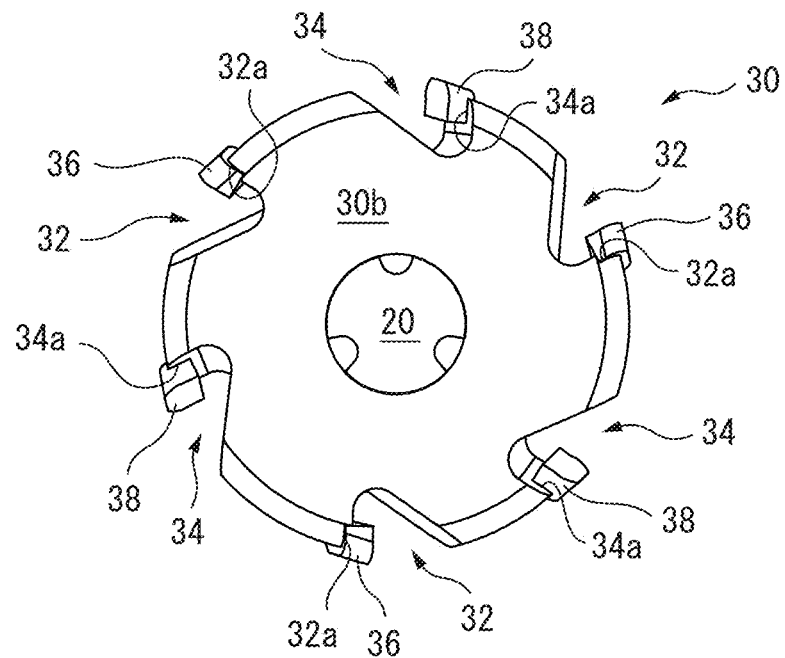
FIG. 3 is a bottom view of the T-shaped tool of FIG. 1 as viewed from the tip side.

The preferred embodiments of the present invention will be described below with reference to the attached drawings.

A T-shaped tool 10 comprises a shank 20 which is mounted on the tip of a spindle or tool holder of a machine tool and a head 30 which is coupled to the tip of the shank 20. The shank 20 is composed of, for example, a highly rigid cemented carbide rod-shaped member having a substantially cylindrical shape, and an external thread 24 is formed on the tip thereof. The external thread 24 is a tapered thread, the diameter of which decreases in the tip direction of the shank 20. The external thread 24 can be a tapered thread having, for example, a pitch of 1 to 2 mm, a thread height of 0.5 to 2 mm, and a taper ratio of 1/50 to 1/20. It is desirable that the maximum outer diameter of the tapered thread be substantially equal to the diameter of the shank 20.

A coolant pathway for the supply of coolant to the cutting edge can be formed in the shank 20. The coolant pathway can include an axial pathway 26 which passes through the shank 20 along the central axis 0 and radial pathways 28 which pass radially through the shank 20 from the axial pathway 26.

The head 30 forms the tool body of the T-shaped tool 10 and can be formed from, for example, a steel material. A plurality, and in the present embodiment, six, of blades are formed on the head 30. In the present embodiment, the blades are formed by inserts 36, 38 attached to the head 30. The inserts 36, 38 can be formed from, for example, cemented carbide, which has high wear resistance. The inserts 36, 38 include three upper inserts 36 which protrude on the proximal side of the T-shaped tool 10, i.e., the shank 20 side, and three lower inserts 38 which protrude on the distal side of the T-shaped tool 10, i.e., the side opposite the shank 20.

A plurality, and in the present embodiment, six, of grooves 32, 34, corresponding to the number of inserts 36, 38, are formed in the head 30. The grooves 32, 34 extend from the proximal surface 30a of the head 30 facing the shank 20 to the tip surface 30b facing opposite the shank 20. The grooves 32, 34 include first grooves 32 for receiving the upper inserts 36 and second grooves 34 for receiving the lower inserts 38. A lower seat 32a for attachment of an upper insert 36 is formed in each first groove 32. A lower seat 34a for attachment of a lower insert 38 is formed in each second groove 34. The upper inserts 36 and the lower inserts 38 are attached to the upper seats 32a and the lower seats 34a using a suitable bonding technology such as brazing.

Figure 9:
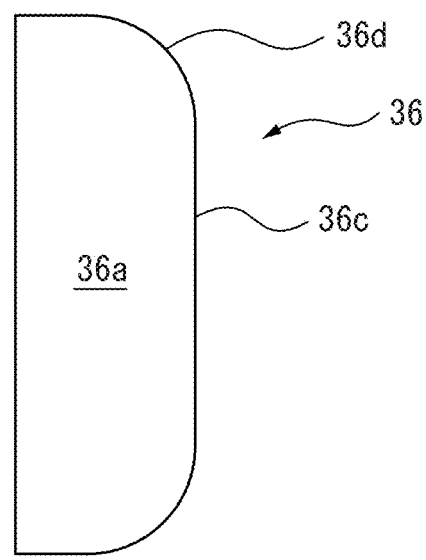
FIG. 9 is a front view of an upper insert.
Figure 10:
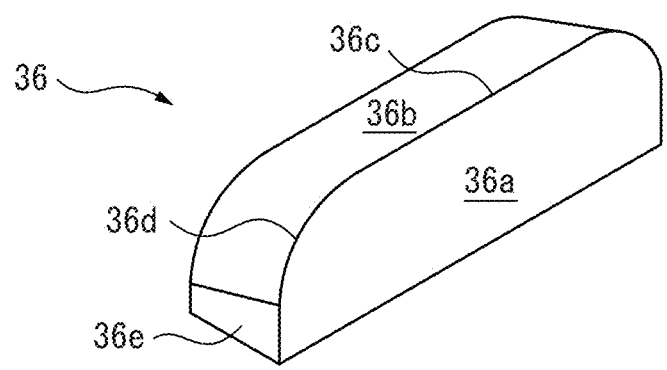
FIG. 10 is a perspective view of the upper insert of FIG. 9.
Figure 11:
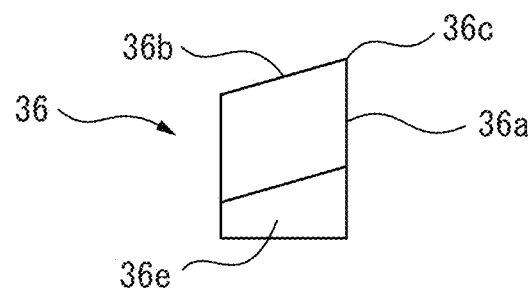
FIG. 11 is a side view showing an upper end surface of the upper insert of FIG. 9.

The upper inserts 36 and the lower inserts 38 are formed in the same shape. Though only an upper insert 36 is illustrated in FIGS. 9 to 11, the lower insert 38 is identical thereto. The upper insert 36 has a rake face 36a on the side opposite the upper seat 32a, when attached to the upper seat 32a, and a flank face 36b which faces radially outward. A linearly extending main cutting edge 36c and an arc-shaped sub cutting edge 36d, which is connected to the main cutting edge 36c on the upper end of the upper insert 36, are formed by the rake face 36a and the flank face 36b. A sub flank face 36e may be formed on the end on which the sub cutting edge 36d is formed. The shape and dimensions of the arc-shaped sub cutting edge 36d can be determined in accordance with the size of the fillet R of the machined surface to be machined on the workpiece.

The upper insert 36 is attached to the upper seat 32a so that the main cutting edge 36c protrudes from the outer peripheral surface of the head 30 and the sub cutting edge 36d protrudes from the proximal surface 30a of the head 30. Likewise, the lower insert 38 is attached to the lower seat 34a so that the main cutting edge 36c protrudes from the outer peripheral surface of the head 30 and the sub cutting edge 36d protrudes from the tip surface 30b of the head 30. Furthermore, the upper inserts 36 and the lower inserts 38 are alternatingly arranged at regular intervals in the circumferential direction of the head 30. In order to prevent chatter, the upper inserts 36 and the lower inserts 38 may be alternatingly arranged at irregular intervals in the circumferential direction.

Figure 4:
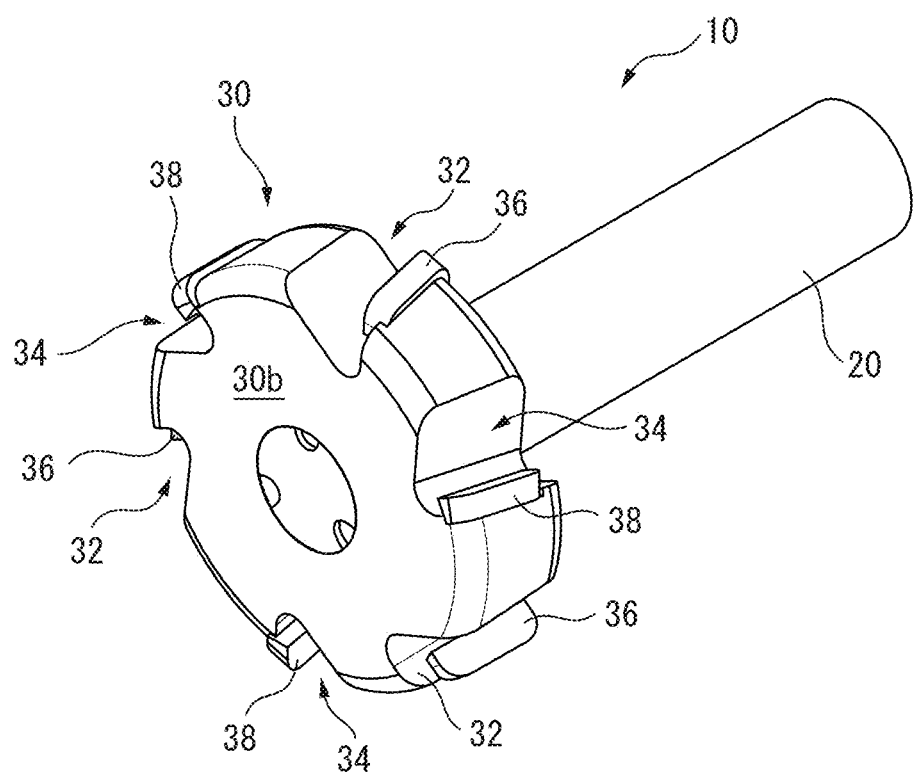
FIG. 4 is a perspective view of the T-shaped tool of FIG. 1.
Figure 5:
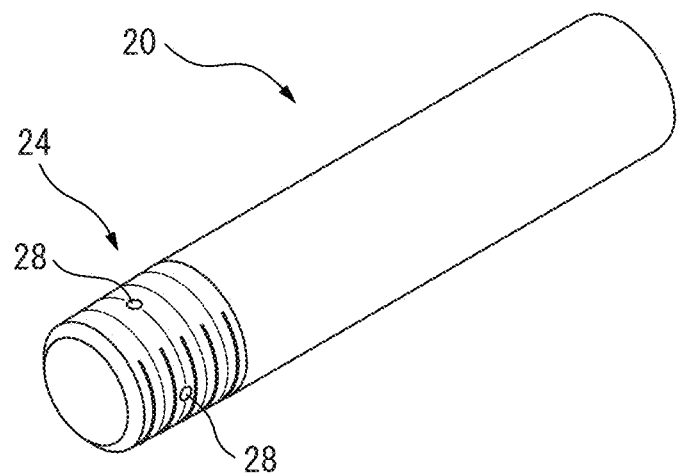
FIG. 5 is a perspective view of the shank of the T-shaped tool of FIG. 1.
Figure 6:
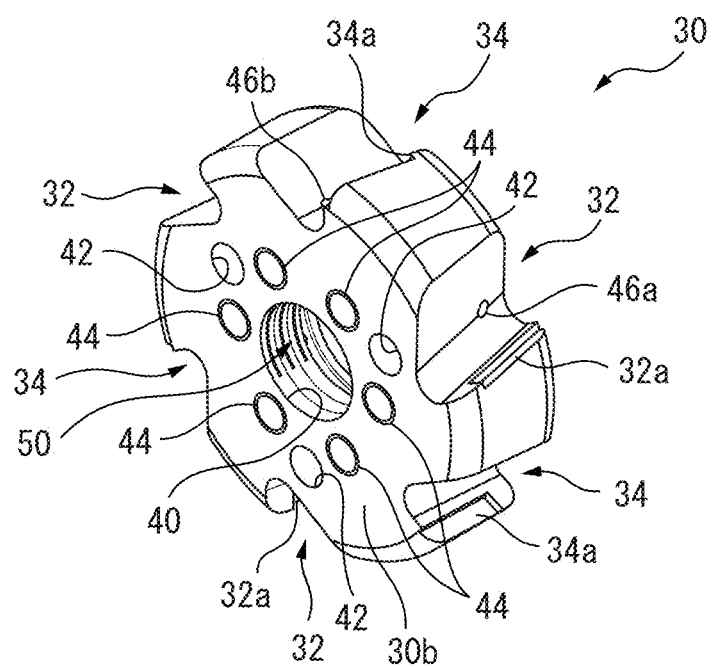
FIG. 6 is a perspective view of the head of the T-shaped tool of FIG. 1.
Figure 7:
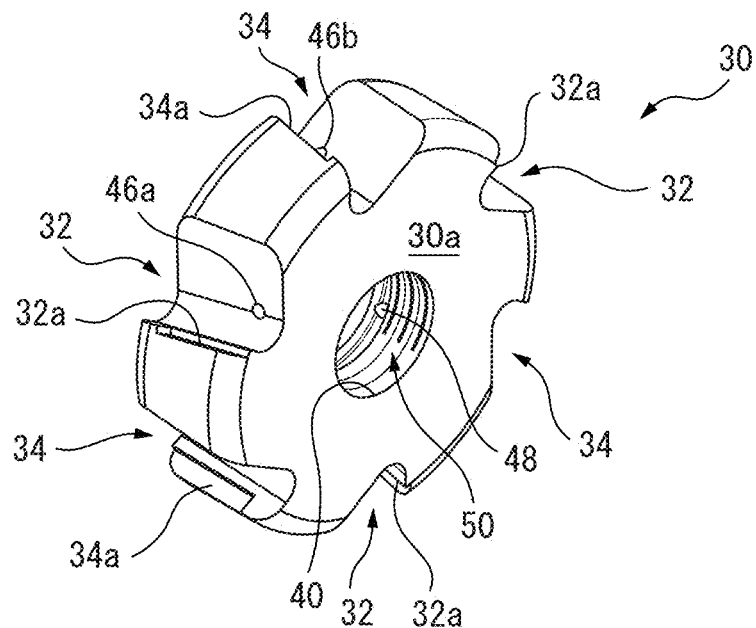
FIG. 7 is a perspective view of the head as viewed from another direction.

Referring specifically to FIGS. 1 and 4, the upper seat 32a is formed so that the rake face 36a of an attached upper insert 36 is oriented downward. Specifically, when viewed from the tip side of the T-shaped tool 10, the upper insert 36 is inclined with respect to the head 30 so that the rake face of the upper insert 36 can be seen. Likewise, the lower seat 34a is formed so that the rake face of an attached lower insert 38 is oriented upward. Specifically, when viewed from the shank 20 side, the lower insert 38 is inclined with respect to the head 30 so that the rake face of the lower insert 38 can be seen.

Figure 8:
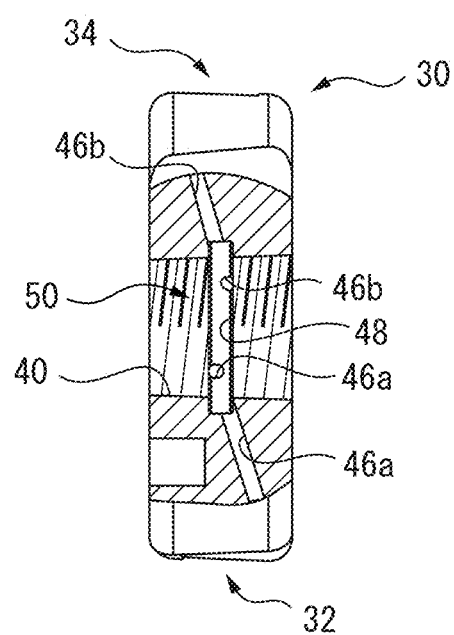
FIG. 8 is an axial cross-sectional view of the head.

Further, an aperture 40 is formed in a central portion of the head 30. The internal thread 50 for engagement with the external thread 24 is formed on the inner circumferential surface of the aperture 40. The internal thread 50 is a tapered thread, the diameter of which decreases in the tip direction of the T-shaped tool 10. A circumferential groove 48 (FIG. 8) is formed in the inner circumferential surface of the aperture 40. The circumferential groove 48 is arranged so that when the external thread 24 of the shank 20 is engaged with the internal thread of the aperture 40 and the head 30 is connected to the shank 20, the radial passages 28 can open into the circumferential groove 48.

Branch passages 46a, 46b which pass from the circumferential groove 48 radially through the head 30 and which open in the grooves 32, 34 on the side surface on the side opposite the upper seat 32a and the lower seat 34a, respectively, are formed in the head 30. More specifically, the branch passages 46a, 46b extend in the direction in which coolant is ejected toward the rake faces 36a of the upper insert 36 and the lower insert 38 attached to the upper seat 32a and the lower seat 34a, respectively. By providing coolant from the coolant passage toward the upper insert 36 and the lower insert 38, heat generated by cutting can be reduced, and tool life and swarf discharge are improved.

By engaging the external thread 24 of the shank 20 with the internal thread 50 of the aperture 40 of the head 30, the head 30 is fastened and coupled to the shank 20. At this time, the head 30 is coupled to the shank 20 with a fastening torque that is greater than the maximum torque due to the cutting acting on the head 30 during machining. This is a measure to prevent the tapered threads from being further tightened by the torque based on the cutting, thereby deforming the head 30 and changing the posture of the inserts 36, 38. Engagement holes 42 which engage a tightening tool (not illustrated) for imparting the head 30 with the desired fastening torque can be formed in the tip surface 30b of the head 30. Further, a plurality of threaded holes 44 may be formed in the tip surface 30b of the head 30, and screws (not illustrated) may be attached thereto for balancing the rotation of the T-shaped tool 10.

Furthermore, in order to prevent loosening of the connection between the internal thread 50 of the head 30 and the external thread 24 of the shank 20 due to vibrations or the like that occur during cutting using the T-shaped tool 10, at least one recess 22 may be formed in the tip of the shank 20, and the shank 20 and the head 30 may be welded at the recess 22 after the head 30 is coupled with the shank 20. Due to the weld, the molten metal of the weld rod is integrated with the steel material of the head 30 and flows into the recess 22. Since shank 20 is composed of cemented carbide, it cannot be welded, but the metal that flows into the recess 22 and solidifies acts as a key, thus forming a detent. When loosening the connection between the external thread 24 and the internal thread 50 to separate the shank 20 and the head 30, the shank 20 and the head 30 can be easily separated by loosening the threaded connection while welding the weld part and melting the metal that has flowed into the recess 22. Thereafter, the head 30 can be changed by newly connecting another head 30 to the shank 20 and performing the same welding.

Further, after the head 30 has been coupled with the shank 20, the T-shaped tool 10 can be finished by grinding so that the main cutting edges and the sub cutting edges of the upper insert 36 and the lower insert 38 have the desired sizes, shapes, and postures.

According to the present embodiment, the shank 20 does not have a characteristic portion that abuts the proximal surface 30a of the head 20. Thus, when the head 30 is threadedly connected to the shank 20, a tensile load is not exerted on the threaded portion (external thread 24) of the shank 20, unlike in the invention of Patent Literature 1. Thus, cemented carbide, which has a high rigidity, can be used for the shank 20, machining speed (cutting speed) can be increased to improve machining efficiency. Furthermore, by forming the shank 20 from cemented carbide (the Young's modulus thereof is about three times greater than that of steel), the shank 20 is less likely to become deformed, whereby machining accuracy can be increased.

According to the present embodiment, material cost and manufacturing cost can be remarkably reduced as compared with a T-shape tool in which the shank and head are cut from a single piece of cemented carbide and are integrally formed in a T-shape. Furthermore, in the present embodiment, it is not necessary to specially produce a reference surface for contacting the shank and the head and a fixation screw, unlike in the invention of Patent Literature 1, whereby manufacturing cost can be reduced.

Alternatively, instead of tightening the external thread 24 of the shank 20 and the internal thread 50 of the head 30 with a fastening torque which is greater than the maximum torque based on the cutting acting on the head 30 during machining, the head 30 may be heated to increase the inner diameter of the internal thread 50, and the external thread 24 of the shank 20 may be tightened and then naturally cooled, whereby tapered thread connection may be performed tightly due to the shrink fit effect. Note that in this case, the heating temperature may be approximately 150° C., which is sufficiently lower than the temperature at which the inserts 36, 38 are brazed to the tool body 30, which is approximately 700° C., and the coating temperature of the inserts 36, 38, which is approximately 500° C., whereby the heating does not adversely affect the brazing or coating.

REFERENCE SIGNS LIST

10 T-shaped tool
20 shank
24 external thread
30 head
36 upper insert
38 lower insert
50 internal thread

The invention claimed is:

1. A T-shaped tool in which a tool body having a cutting edge and a cylindrical shank are connected in a T-shape in a side view, wherein
   the shank is composed of cemented carbide and has a tapered external thread, the diameter of which decreases in the tip direction, formed on a tip thereof, with a maximum outer diameter of the tapered external thread being equal to an outer diameter of the shank,
   the tool body is composed of steel and has an aperture extending through the tool body at a central portion of the tool body, and a tapered internal thread, formed on the inner circumferential surface of the aperture, for engagement with the tapered external thread, and
   the shank and the tool body are connected by engaging the tapered external thread with the tapered internal thread without abutting the shank onto a proximal surface of the tool body.

2. The T-shaped tool of claim 1, comprising at least one recess formed in an outer periphery of a tip surface of the shank and a decent which is formed by welding, in a state in which the shank and the tool body are fastened, the tip surface of the tool body in the vicinity of the recess, whereby molten metal flows into the recess.

* * * * *